United States Patent [19]

Fukushima et al.

[11] Patent Number: 4,765,661
[45] Date of Patent: Aug. 23, 1988

[54] UNION JOINT ASSEMBLY

[75] Inventors: Koji Fukushima; Isamu Sasaki, both of Konan, Japan

[73] Assignees: Diesel Kiki Co., Ltd., Tokyo; Mitoyo Industries Co., Ltd., Saitama, both of Japan

[21] Appl. No.: 31,182

[22] Filed: Mar. 30, 1987

Related U.S. Application Data

[63] Continuation-in-part of Ser. No. 796,447, Nov. 8, 1985, abandoned.

[51] Int. Cl.4 .............................................. F16L 19/02
[52] U.S. Cl. ................................. 285/382.5; 285/353; 29/523
[58] Field of Search ............ 285/353, 387, 388, 382.5, 285/382.4, 384; 29/523, 437

[56] References Cited

U.S. PATENT DOCUMENTS

| | | | |
|---|---|---|---|
| 609,030 | 8/1898 | Keller | 285/387 |
| 3,207,537 | 9/1965 | Kimbrell et al. | 285/353 |
| 3,315,987 | 4/1967 | White | 285/353 X |
| 3,357,725 | 12/1967 | Champion | 285/353 |
| 4,575,134 | 3/1986 | Sugano | 285/353 |

FOREIGN PATENT DOCUMENTS

| | | | |
|---|---|---|---|
| 406764 | 3/1934 | United Kingdom | 285/353 |
| 493675 | 10/1938 | United Kingdom | 285/353 |

Primary Examiner—Thomas F. Callaghan
Attorney, Agent, or Firm—Wenderoth, Lind & Ponack

[57] ABSTRACT

A union joint assembly comprising a union fitted around and end of one pipe, a nut fitted around an end of the other pipe and adapted to be screwed to the union for joining the ends of pipes, and a retaining means for retaining the union on said one pipe against axial displacement with respect to the one pipe. The retaining means comprises an annular recess opening to an axial central through-hole and an annular ridge projecing radially outwardly from the outer periphery of said one pipe and fitted in the recess.

4 Claims, 2 Drawing Sheets

UNION JOINT ASSEMBLY

This application is a continuation-in-part of now abandoned application Ser. No. 796,447, filed Nov. 8, 1985.

BACKGROUND OF THE INVENTION

1. Field of the Invention:

The present invention relates to a union joint assembly suitable for use in a refrigeration system to join two pipes end to end.

2. Prior Art:

There are known various union joint assemblies of the type described in which a union and a nut, which are fitted respectively around opposed end portions of two pipes, are fastened together to join the pipes with an O-ring sealingly interposed between a flared end of one pipe and an outer circumferential ridge on the other pipe whose end portion is fitted in the end portion of said one pipe. While it is prevented from moving beyond the flared end, the union is allowed to move along the pipe in a direction away from the flared end. With this construction, when joining two pipes to install a cooler unit on an automobile, for example, the union must be moved onto the flared end with the result that assembling of a union joint and hence installation of the cooler unit becomes tedious and time-consuming.

Japanese Utility Model Laid-open Publication No. 57-174214 discloses a somewhat successful union joint assembly which includes an outer circumferential ridge formed on a pipe adjacent to a union carried thereon so as to restrict axial movement of the union to a limited extent between the ridge and a flared end of the pipe. The disclosed union joint assembly is, however, still unsatisfactory in that the union has to be manually brought into engagement with the flared pipe end and held in this condition until the union and the nut is tightly fastened together. The union, if not so threaded with the nut, would corotate with the nut. Another disadvantage of this assembly is in that since the ridge is located near the union, it is difficult to provide a bend adjacent to the union.

SUMMARY OF THE INVENTION

It is accordingly an object of the present invention to provide a union joint assembly which can join two pipes quickly and easily.

Another object of the present invention is to provide a union joint assembly including a union stably retained on a pipe against axial displacement.

According to the present invention, the foregoing and other objects of the present invention are attained by a union joint assembly comprising: a pair of pipes adapted to be joined together end to end; a union fitted around an end of one of said pipes and having an externally threaded portion; a nut fitted around an end of the other pipe and adapted to be screwed to said externally threaded portion of said union for joining said ends of said pipes; and means for retaining said union on said one pipe against axial displacement with respect to said one pipe. The retaining means comprises a recess opening to an axial central through-hole and a ridge projecting radially outwardly from the other periphery of the one pipe and fitted in the recess. The ridge comprises a radially outwardly swelled portion of said one pipe. Preferably the recess is disposed adjacent to an end of the union which faces away from the nut when the latter is threaded on the union.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE INVENTION

DETAILED DESCRIPTION

Figure 1:
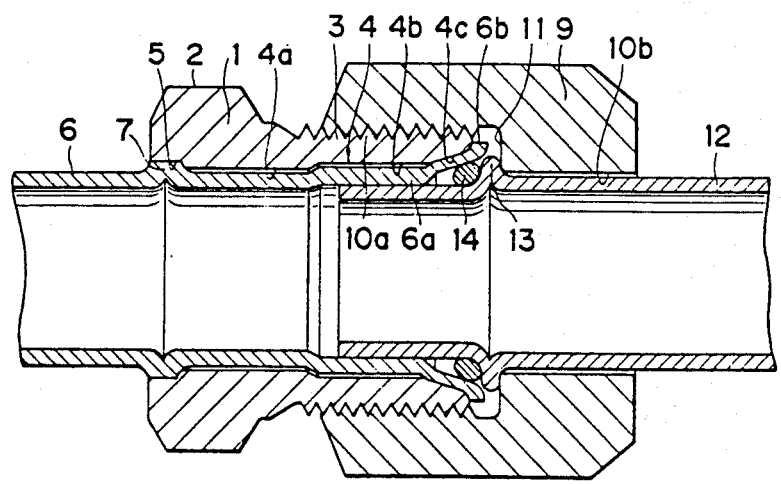
FIG. 1 is a longitudinal cross-sectional view of a union joint assembly embodying the present invention.

The principles of the present invention are particularly useful when embodied in a union joint assembly such as shown in FIG. 1.

Figure 2:
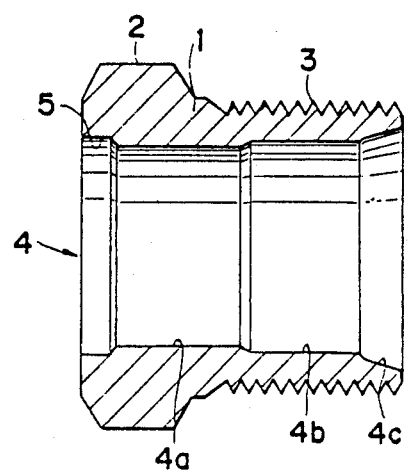
FIG. 2 is a view similar to FIG. 1 showing a union employed in the union joint assembly shown in FIG. 1.

The union joint assembly includes a union 1 made of metal and machined into a ring shape including an enlarged head 2 for use with external wrenches and an externally threaded neck 3 of a reduced diameter extending concentrically from the head 2. The neck 2 is adapted to be threaded into a nut 9 as described below. The union further includes an axial central through-hole 4 for receiving one 6 of two pipes 6, 12 to be joined together end to end. As best shown in FIG. 2, the through-hole 4 includes a small-diameter portion 4a substantially coextending with the head 2 and a large-diameter portion 4b extending rightwards from the small-diameter portion 4a and terminating in a flared end portion 4c opening to a front end of the union 1. The through-hole 4 also includes an annular recess 5 extending from the rear end of the union 1 and blending into the small-diameter portion 4 for purposes described below.

The pipe 6, through which a fluid such as a gaseous refrigerant flows, has a circular cross section having an external diameter slightly smaller than the diameter of the small-diameter portion 4a of the through-hole 4. The pipe 6 supports the union 1 on its one end which includes a large-diameter portion 6a having an external diameter slightly smaller than the diameter of the large-diameter portion 4b of the through-hole 4, and a flared end portion 6b complementary in shape with the flared end portion 4c of the through-hole 4. The flared end portion 6b is held in fitted engagement with the flared end portion 4c of the union 1. The pipe 6 further has an annular ridge 7 projecting radially outwardly from the outer periphery of the pipe 6 and is held in fitted engagement with the annular recess 5 in the union 1 so as to prevent the union 1 from displacing in the axial direction. The ridge 7 and the recess 5 are fitted together to such a degree that they provide a coupling strength which is large enough to retain the union 1 against rotation when tightening the nut 9 below a predetermined amount of force but small enough to allow the union 1 to corotate with the nut 9 when tightening the nut 9 by a force greater than the predetermined force. With this fitting engagement, the nut 9 can easily be threaded over the threaded neck 3 of the union 1 without manually holding the union 1 against rotation. The ridge 7 also serves to increase the mechanical strength of the union joint assembly. Since the ridge 7 is located in the region of the union 1, it is possible to provide a bend in the pipe 6 adjacent to the union 1.

Figure 3:
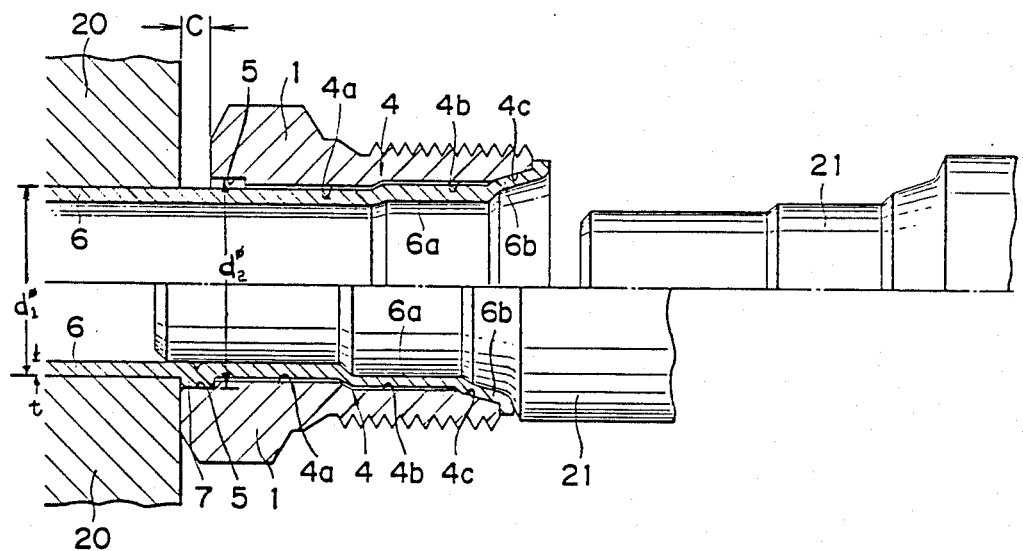
FIG. 3 is a longitudinal cross-sectional view illustrating a manner in which the union is retained on a pipe.
Figure 4:
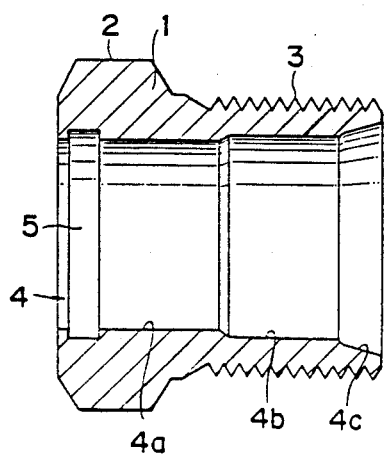
FIG. 4 is a longitudinal cross-sectional view of a modified union according to the present invention.
Figure 5:
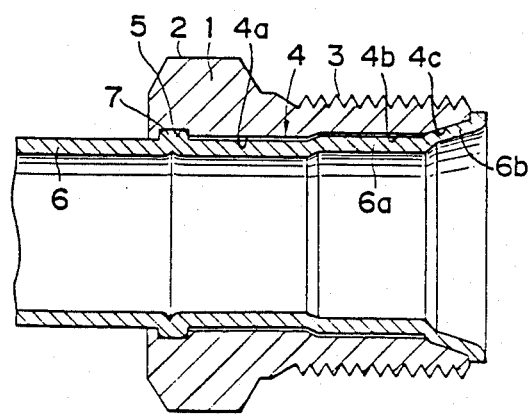
FIG. 5 is a view similar to FIG. 4 showing the union of FIG. 4 as retained on a pipe.

FIG. 3 illustrates a manner in which the union 1 is assembled with the pipe 6 through fitting engagement between the recess 5 and the ridge 7. In this figure, parts shown on the side above the center line are in pre-assembled condition while the lower side shows the parts in assembled condition. In assembling, the union 1 is fitted over the pipe 6 until the flared end portion 4c abuts flatwise against the flared end portion 6b of the pipe 6. Then the pipe 6 is gripped by a clamp 20 with a clearance C defined between the clamp 20 and the union 1. A punch or mandrel 21, which has a peripheral shape complementary to the inner peripheral shape of the through-hole 4 of the union 1, is inserted in the through-hole 4. Then the punch 21 is driven to force the union 1 against the clamp 20, thereby axially compressing the pipe 6 between the clamp 20 and the flared end portion 6b. The pipe 6 thus compressed is locally deformed to swell radially outwardly into the recess 5. Thus the union 1 is retained on the pipe against axial displacement. The degree of fitting engagement between the ridge 7 and the recess 5 and hence the degree of coupling strength between the union 1 and the pipe 6 is adjustable by varying the clearance C.

Typical examples of the coupling strength (i.e., anti-rotational resistance) provided by and between the annual ridge 7 on the pipe 6 and the mating annular recess 5 in the union 1 are shown in the following Table 1.

TABLE 1

| Pipe Outside Diameter $d_1^\phi$ (mm) | Recess Diameter $d_2^\phi$ (mm) | Pipe Thickness t (mm) | Clearance C (mm) | Coupling Strength (Kgm) | Final Tightening force (Kgm) |
|---|---|---|---|---|---|
| 8 | 9.2 | 1.0 | 1.5 | >0.4 | $1.5^{\pm 0.5}$ |
| 12 | 13.2 | 1.0 | 1.6 | >0.5 | $2.0^{\pm 0.5}$ |
| 16 | 17.2 | 1.2 | 1.8 | >0.8 | $2.5^{\pm 0.5}$ |

The above-identified dimensions, i.e. the outside diameter ($d_1^\phi$) of the pipe 6, the diameter ($d_2^\phi$) of the annular recess 5, the thickness (t) of the pipe 6, and the clearance (C) between the clamp 20 and the union 1 are all shown in FIG. 3, and each of the tested pipes 6 were formed from an aluminum rod such as one defined by JIS (A) 3003. It appears from Table 1 that when a pipe 6 having an outside diameter ($d_1^\phi$) of 8 mm and a thickness (t) of 1 mm is chosen and, when a clearance (C) if 1.5 mm is used, and the pipe 6 is subsequently axially compressed to form an annular ridge 7, the resulting annular ridge 7 and the mating annular recess 5 provide a coupling strength of larger than 0.4 Kgm to thereby retain the union 1 against rotation around the pipe 6. Thus, the nut 9 can be threaded by hand on the union 1 without manually holding the union 1 until the tightening force applied on the union 1 exceeds the foregoing coupling strength, whereupon the union 1 corotates with the nut 9. Then the nut 9 and the union 1 are firmly tightened together by suitable tools such as wrenches. The final tightening force required for the pipe 6 of the foregoing dimensions is $1.5^{\pm 0.5}$ Kgm, as shown in Table 1.

It appears from Table 1, the coupling strength increases with an increase in the clearance C.

The nut 9 is made of metal and machined into the shape shown in FIG. 1. The nut 9 includes a non-illustrated wrench-head and an axial central stepped bore composed of an internally threaded portion 10a and a small-diameter portion 10b separated by an annular shoulder 11. The shoulder 11 is engageable with an annular flange 13 on the pipe 12 when threading the nut 9 on the union 1.

The pipe 12 has a circular cross section and includes an extension of a small diameter projecting from the flange 13. The extension is fitted in the large diameter portion 6a of the pipe 6 when two pipes 6, 12 are joined together.

Designated at 14 is an O-ring disposed between the flared end portion 6b of the pipe 6 and the flange 13 of the pipe 12 to provide a seal therebetween.

Obviously, many modifications and variations of the present invention are possible in the light of the above teachings. It is therefore to be understood that within the scope of the appended claims, the invention may be practiced otherwise than as specifically described.

What is claimed is:

1. A union joint assembly comprising:
first and second pipes joined end to end;
a union fitted around an end of said first pipe having an externally threaded portion and an axial through-hole through which said end of said first pipe extends;
a nut loosely fitted around an end of said second pipe having an internally threaded portion for mating engagement with said externally threaded portion of said union for mating said nut to said union to join said first and second pipes, and retaining means on said second pipe for preventing said nut from sliding off of the end of said second pipe; and
means for normally maintaining said union in a fixed rotational position on said first pipe, said maintaining means comprising a recess in said union open to said axial through-hole and a ridge means on the outer periphery of said end of said first pipe which extends through said recess and engages said union, said union and said ridge means being fitted together in such a manner that a predetermined rotational frictional coupling force between said union and said ridge means exists which is large enough to normally prevent said union from rotating relative to said first pipe until a rotating force greater than said predetermined rotational frictional force is exerted on said union by said nut during said mating of said nut to said union.

2. A union joint assembly as claimed in claim 1 wherein;
said recess and said ridge means are annular shaped.

3. A union joint assembly as claimed in claim 1 wherein,
said recess is formed on an end of said union that faces away from said nut when said union and said nut are in mating engagement.

4. A union joint assembly as claimed in claim 1 wherein, said union has a flared end; and
said end of said first pipe has a flared end portion fittedly engaged with said flared end of said union.

* * * * *